(12) United States Patent
Jobanputra et al.

(10) Patent No.: US 10,581,789 B2
(45) Date of Patent: *Mar. 3, 2020

(54) MANAGING MULTIPLE MESSAGES

(71) Applicant: Microsoft Technology Licensing, LLC, Redmond, WA (US)

(72) Inventors: Rishi Jobanputra, Menlo Park, CA (US); Romer E. Rosales-Delmoral, Burlingame, CA (US); Joshua Daniel Hartman, Mountain View, CA (US); Shubhanshu Nagar, Sunnyvale, CA (US); Ryan Oblak, Mountain View, CA (US); Cameron Alexander Lee, San Ramon, CA (US); Hsiao-Ping Tseng, Fremont, CA (US); Shaunak Chatterjee, Sunnyvale, CA (US); Rupesh Gupta, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,133

(22) Filed: Feb. 15, 2019

(65) Prior Publication Data

US 2019/0182200 A1    Jun. 13, 2019

Related U.S. Application Data

(63) Continuation of application No. 15/010,765, filed on Jan. 29, 2016, now Pat. No. 10,263,941.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/14* (2013.01); *H04L 51/26* (2013.01); *H04L 67/10* (2013.01); *H04L 67/306* (2013.01)

(58) Field of Classification Search
None
See application file for complete search history.

(56) References Cited

U.S. PATENT DOCUMENTS

2008/0098125 A1 *  4/2008  Wang Baldonado ....................... G06Q 10/107 709/231
2008/0275957 A1 * 11/2008  Pouzin .................... H04L 51/16 709/206
2016/0205054 A1 *  7/2016  Lu ........................... H04L 51/32 709/206

* cited by examiner

*Primary Examiner* — Phuoc H Nguyen
(74) *Attorney, Agent, or Firm* — Schwegman Lundberg & Woessner, P.A.

(57) ABSTRACT

This disclosure relates to systems and methods for managing multiple messages. In one example, a method includes determining a message transmission frequency threshold for a member of an online social networking service using responses from the member; receiving a message that is to be transmitted to the member; storing the message, without transmitting the message to the member, in a digest of messages for the member; and transmitting the digest to the member in response to a send score for the digest exceeding a send score threshold, the send score calculated using the number of messages in the digest.

20 Claims, 9 Drawing Sheets

MANAGING MULTIPLE MESSAGES

CROSS-REFERENCE TO RELATED APPLICATIONS

This application is a continuation of prior application Ser. No. 15/010,765, filed on Jan. 29, 2016, which is incorporated by reference herein in its entirety.

TECHNICAL FIELD

The subject matter disclosed herein generally relates to electronic communications and, more particularly, to managing multiple messages at an online social networking service.

BACKGROUND

Members of an online social networking service typically connect with many different members for a wide variety of reasons. A member generally uses the social networking service to communicate with other members. Furthermore, the member relies on the social networking service to provide other types of data transmitted via a message.

In some examples, the online social networking service provides news feeds, alerts, entertainment, messages from other members, and other types of messages and/or notifications

BRIEF DESCRIPTION OF THE DRAWINGS

Some embodiments are illustrated by way of example and not limitation in the figures of the accompanying drawings.

DETAILED DESCRIPTION

Figure 1:
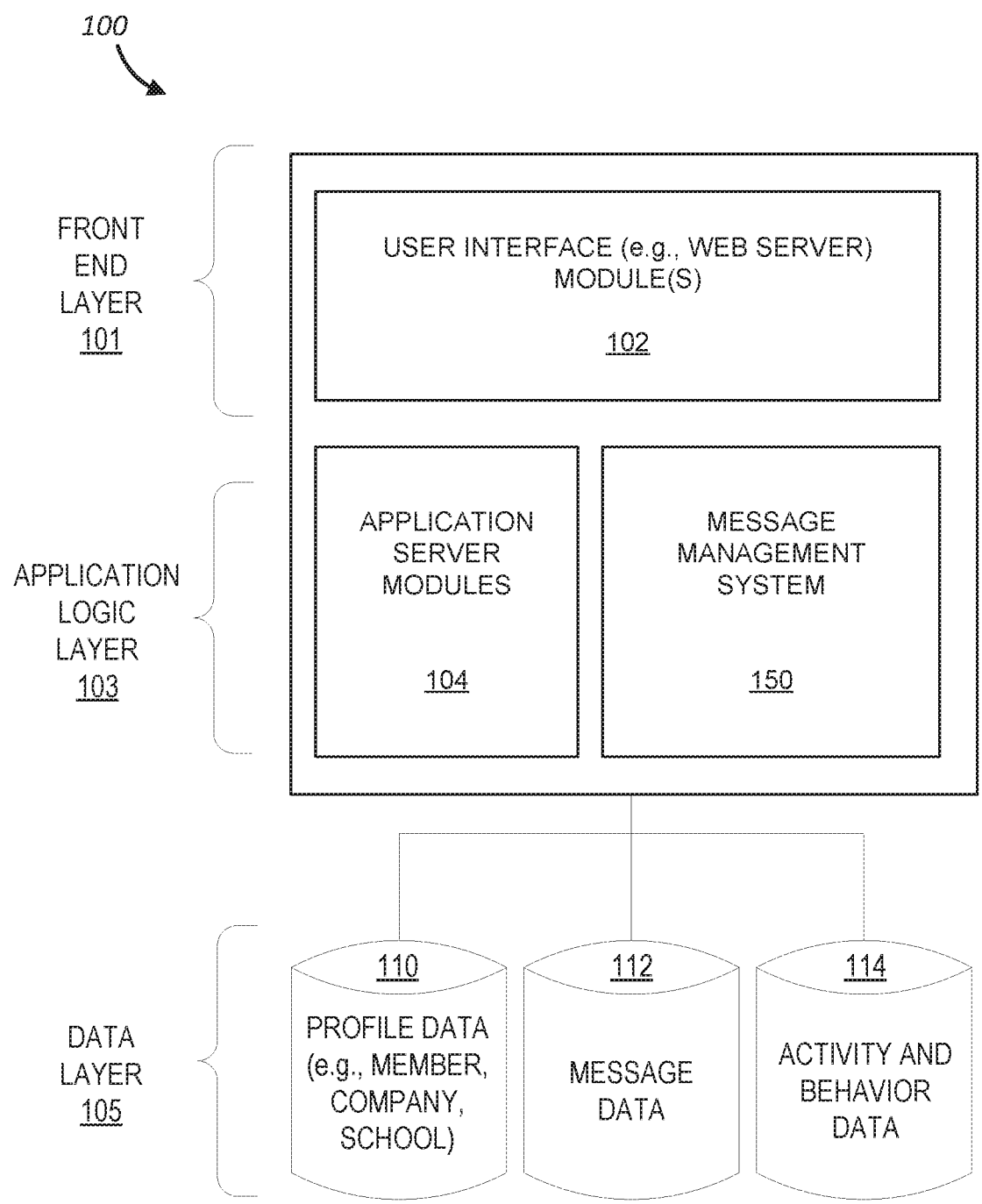
FIG. 1 is a block diagram illustrating various components or functional modules of an online social networking service in an example embodiment.

The description that follows includes systems, methods, techniques, instruction sequences, and computing machine program products that embody illustrative embodiments of the inventive subject matter described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to managing multiple messages to be transmitted to a member of an online social networking service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some examples, members that are subscribed to different features are inundated with messages from the online social networking service. However, sending too few messages to the member may leave the member uninformed. Sending too many messages to the member may annoy the member or cause the member to not read all messages. Such inattentiveness (due to too many messages) may cause the member to miss important messages. Managing messages to a member in such a heavy message environment is a challenge.

In certain example embodiments, a system as described herein determines a message transmission frequency threshold for a member of an online social networking service using responses from the member. Based, at least in part, on how the member responds to messages from the online social networking service, the system determines a frequency of messages that the member tolerates without responding negatively. In one example, in response to sending five or less messages per day to the member, the member may click on the messages and subsequently interact with the online social networking service. However, in response to six or more messages per day, the member may not respond positively. In this example, the system determines that the member has a message frequency threshold of five because the member may receive up to five messages per day without negative response.

In another example embodiment, the system receives a message that is to be transmitted to the member, and stores the message in a digest of messages for the member in response to a current message transmission frequency exceeding the transmission frequency threshold. For example, if the system determines that a member's frequency threshold is less than three messages per day, in response to receiving a fourth message for the member, the system may instead store the message in a digest of messages and transmit the digest to the member in a subsequent time period (e.g., the next day).

In another example embodiment, the system scores a digest based, at least in part, on a number of messages in the digest, an amount of time a message has been in the digest, a priority level of a message in the digest, or other message parameters. In response to the score for the digest exceeding a threshold score, the system transmits the digest to the member.

In this way, the system reduces a number of emails transmitted to members. The system learns each member's preferences and may transmit as many messages as the member can tolerate. Accordingly, the system transmits as many message as possible without annoying members of the online social networking service.

FIG. 1 is a block diagram illustrating various components or functional modules of an online social networking service 100, in an example embodiment. The online social networking service 100 may be utilized to manage multiple messages to be transmitted to a member of the online social networking service 100. In one example, the online social networking service 100 includes a message management system 150 that performs the various message management operations described herein. For example, message management system 150 may implement the method depicted in FIGS. 7 and/or 8.

A front end layer 101 consists of one or more user interface modules (e.g., a web server) 102, which receive requests from various client-computing devices and communicate appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content to be transmitted, via a message, to other members of the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

In some examples, the online social networking service 100 includes the message management system 150, which determines a message transmission frequency threshold for a member of an online social networking service 100 using responses from the member as the member responds positively in response to a current message transmission frequency that is below the message transmission frequency threshold and the member responds negatively in response to the current message transmission frequency being at or above the message transmission frequency threshold.

In one example embodiment, the message management system 150 receives a message that is to be transmitted to the member and stores the message in a digest of messages for the member in response to a current message transmission frequency exceeding the transmission frequency threshold for the member. In another example embodiment, the message management system 150 transmits the digest to the member in response to a send score for the digest exceeding a send score threshold, with the send score calculated using the number of messages in the digest. As will be further described, the score for the digest uses one or more of: a number of messages in the digest, a type of messages in the digest, message priorities for messages in the digest, an age of messages in the digest, or other properties of messages in the digest.

As illustrated, the data layer 105 includes, but is not necessarily limited to, several databases 110, 112, 114, such as a database 110 for storing profile data, including both member profile data as well as profile data for various organizations. In certain examples, the profile data includes the properties and/or characteristics of members of the online social networking service 100. Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, the names of the member's spouse and/or family members, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the online social networking service 100, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, education level, or seniority level within a particular company. With some examples, importing or otherwise accessing data from one or more externally hosted data sources may enhance profile data for both members and organizations. For instance, with companies in particular, financial data may be imported from one or more external data sources and made part of a company's profile. In one example, the database 110 includes a member's message frequency threshold as determined by the message management system 150.

The database 110, in one example, stores the messages that are to be transmitted to members of the online social networking service 100. In one example, as members submit messages or other content to the online social networking service (e.g., through one or more graphical user interfaces provided by one or more of user interface modules 102 and application server modules 104), the online social networking service 100 stores the content in the database 112. In other examples, the message management system 150 stores messages digests in the database 112.

The online social networking service 100 may provide a broad range of other applications and services that allow members the opportunity to share and receive information, often customized to the interests of the member. For example, with some examples, the online social networking service 100 may include a message sharing application that allows members to upload and share messages with other members. With some examples, members may be able to self-organize into groups, or interest groups, organized around a subject matter or topic of interest. With some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interaction may be stored, for example, as indicated in FIG. 1, by the database 114. In one example embodiment, the interactions are in response to receiving a message requesting the interaction.

Although not shown, with some examples, the online social networking service 100 provides an API module via which third-party applications can access various services and data provided by the online social networking service 100. For example, using an API, a third-party application may provide a user interface and logic that enables the member to submit and/or configure a set of rules used by the message management system 150. Such third-party applications may be browser-based applications or may be operating system specific. In particular, some third-party applications may reside and execute on one or more mobile devices (e.g., phone, or tablet computing devices) having a mobile operating system.

Figure 2:
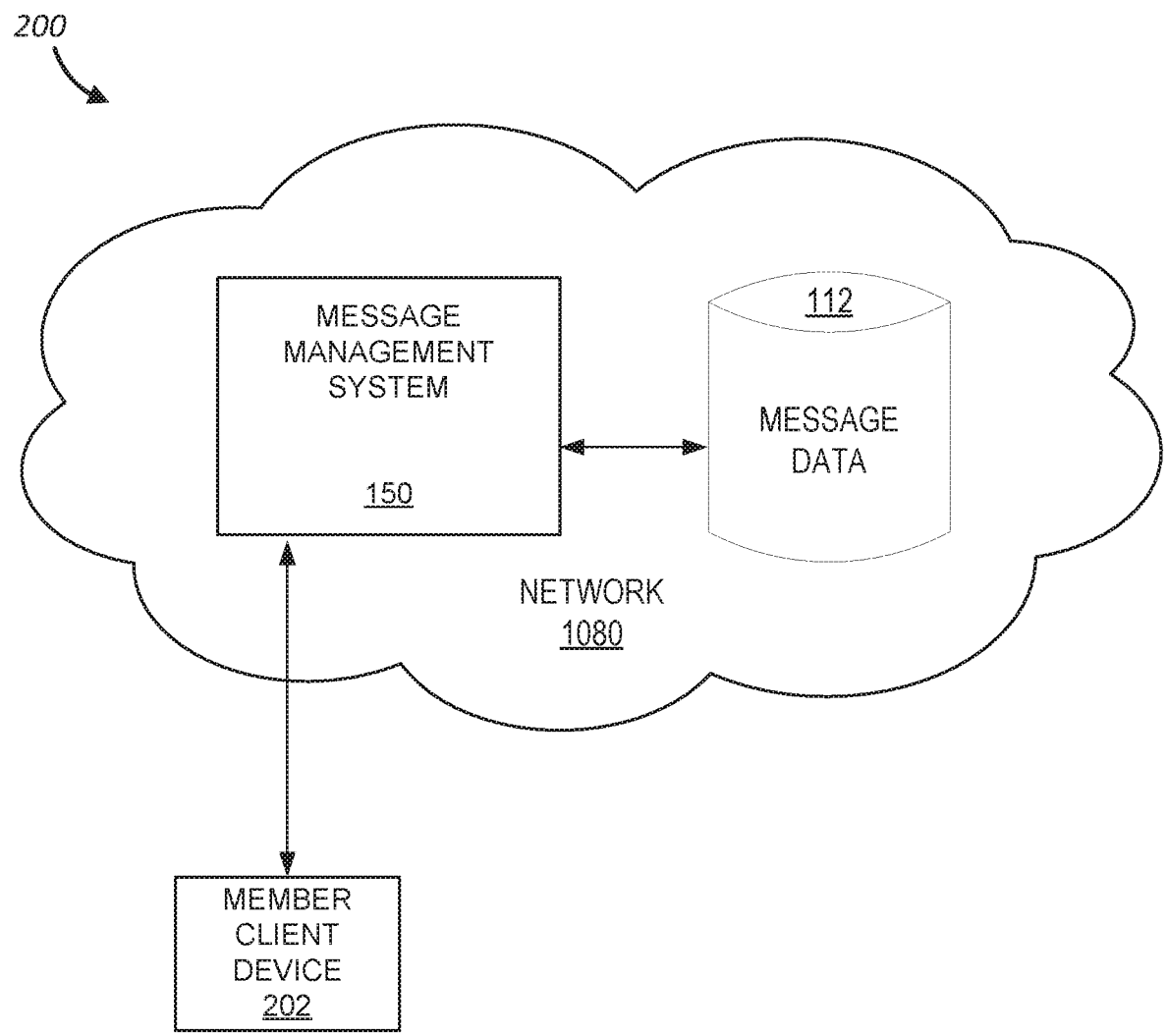
FIG. 2 is a block diagram illustrating a system for managing multiple messages, according to one example embodiment.

FIG. 2 is a block diagram illustrating a system for managing multiple messages, according to one example embodiment. In this example embodiment, the system 200 includes the message management system 150, the database 112, and a member client device 202.

In one example embodiment, the message management system 150 and the database 112 are connected via a network 1080. In one specific example, the network 1080 is the Internet; however, this is not necessarily the case. As one skilled in the art may appreciate, the member client device 202 may communicate with the message management system 150 using any known communication technique. In certain examples, the communication technique includes wired or wireless communication techniques.

In one example embodiment, a member uses the member client device 202 to communicate with the message management system 150. As the member client device 202 receives messages for the member, the member may respond to the messages using the member client device 202. In one specific example, as the member interacts more frequently with the message management system 150, the member receives current messages from the message management system 150.

In some examples, a number of messages to be transmitted to the member client device 202 from the message management system 150 overwhelms the member. In one specific example, a member may be especially prominent and may be connected to many different members of the online social networking service 100. In this example, the member may receive messages from hundreds or even thousands of other members of the online social networking service 100. In this example, when a member receives hundreds or thousands of messages on a daily basis, the member no longer responds to each message received.

In one example, the member receives 10 or less messages per day and the member responds to each of the 10 messages. Furthermore, in another day, the member may receive more than 50 messages in a day and the member may not respond to each of the 50 messages. In one example, in response to the member responding to 10 of the 50 messages in a day, the message management system 150 may determine that the member has a message frequency threshold of about 10 messages per day.

In response, as the member receives less than 10 messages in a day, the message management system 150 may transmit each of the messages to the member (e.g., transmit each of the messages to the member client device 202). Furthermore, if the message management system receives more than 10 messages to be transmitted to the member, the message management system 150 may instead store the messages in a digest of messages for the member. In this way, the member receives only one message in a day as compared with 50 or more messages a day.

In one example embodiment, the digest stores the messages in their entirety. In another embodiment, the digest includes an initial portion of the messages with a link to the whole messages. In another example embodiment, the digest includes a selectable list of messages.

Providing a digest of messages allows the member to more efficiently respond to messages received from the online social networking service 100. In this way, as the message management system 150 monitors a member's responses to messages transmitted to the member, the message management system 150 can determine a message frequency threshold value for the member. In another example embodiment, the message frequency threshold is adjusted based, at least in part, on user responses to the digest. In one example, in response to the member not responding positively to the digest, the message management system 150 may increase the send score threshold for the digest causing the digest to be transmitted at a reduced rate.

In another example embodiment, the message management system 150 ranks the messages in the digest based on a priority value. In one example, messages in the digest received from other members of the online social networking service 100 that are associated with the member (e.g., are connected to the member) are assigned an increased priority value. In another example embodiment, messages in the digest received from famous or otherwise prominent people are also assigned an increased priority value.

In another example embodiment, the digest module increases a priority value for a message in the digest in response to properties that are common between the recipient member and the sending member of the online social networking service 100. As will be further described in subsequent paragraphs, a message increases in priority as a higher number of common properties are determined.

In one example embodiment, the message management system 150 configures a multi-objective optimization problem. For example, the message management system 150 may monitor member responses to a set of messages to be transmitted to the member and may estimate either positive or negative responses to the message using member responses to previous messages that are similar. In this example, the message management system 150 configures the multi-objective optimization problem to generate a probability that the member will either respond positively or negatively. In response to the multi-objective optimization problem estimating that the member will respond negatively, the message management system 150 stores the message in a digest of messages which will later be transmitted to the member.

In certain examples, the message management system 150 trains a machine learning system to generate the probability as one skilled in the art may appreciate. In one example, the message management system 150 trains a machine learning system using a neural network, genetic algorithm, or other learning algorithm based on other similar members' responses to similar messages and/or similar message transmission frequencies. In one example, the probability is a statistical average of other members of the online social networking system.

Furthermore, the message management system 150 may also monitor a frequency of messages transmitted to various members. As members respond either positively or negatively to messages at certain message transmission frequencies, the message management system 150 estimates a message transmission frequency threshold based on similar members and how they have responded to various message transmission frequencies.

Figure 3:
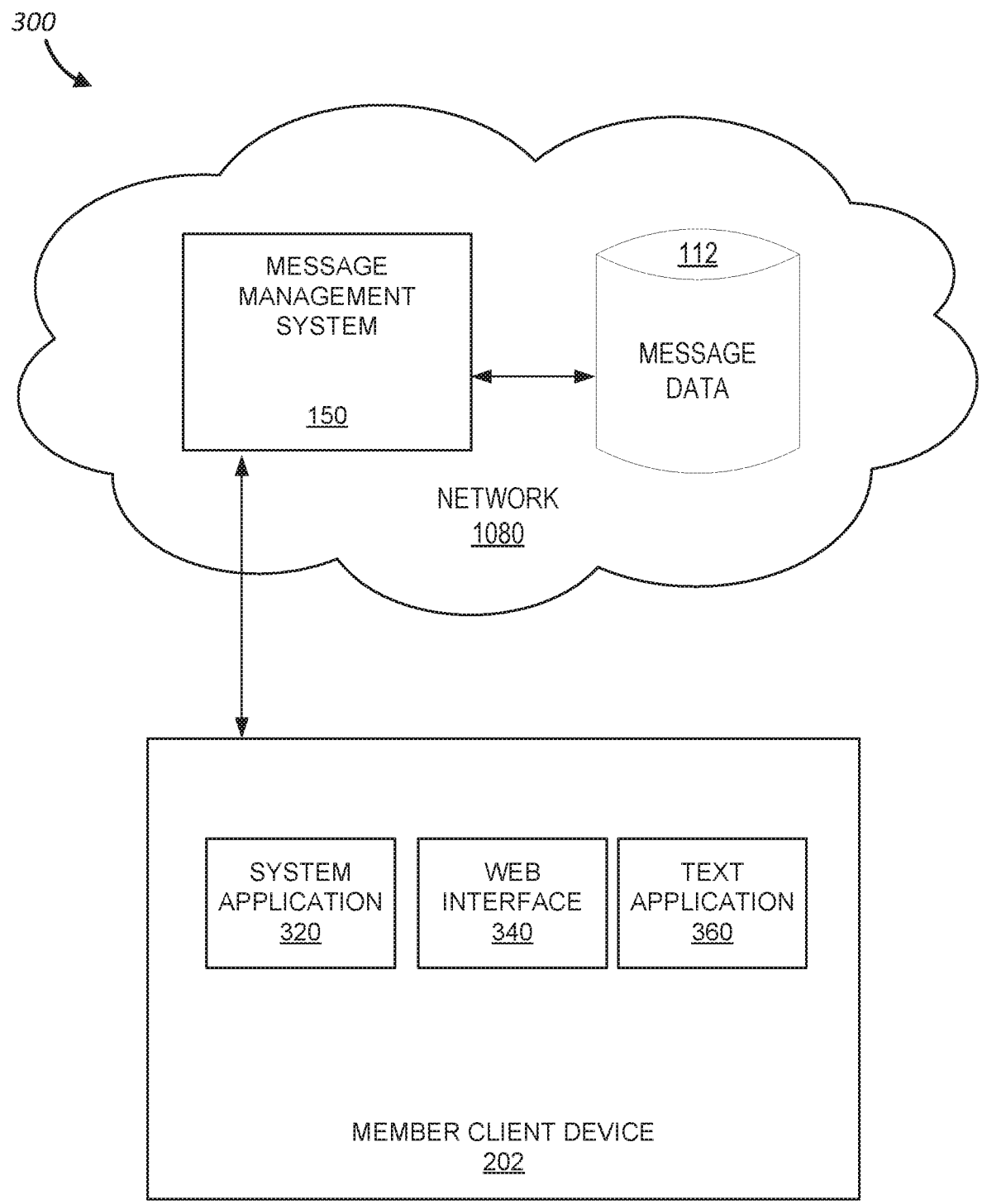
FIG. 3 is a block diagram illustrating another system for managing multiple messages, according to one example embodiment.

FIG. 3 is a block diagram illustrating another system for managing multiple messages, according to one example embodiment. In this example embodiment, the system 300 includes the message management system 150, the database 112, the network 1080, and the member client device 202. Furthermore, the member client device 202 includes a system application 320, a web interface 340, and a text messaging application 360.

In one example embodiment, the system application 320 is a software application configured to receive messages from the message management system 150. In one example, the member downloads the system application 320 from the message management system 150 and executes the system application 320 on the member client device 202. In this example, as messages are received by the message management system 150 that are to be transmitted to the member, the message management system 150 may transmit the message to the system application 320.

In another example embodiment, the web interface 340 is configured to allow a member using the member client device 202 to communicate with the message management system 150. In this example embodiment, messages destined for the member using the member client device 202 are stored in the database 112 and retrieved by the message management system 150 in response to the member communicating with the message management system using the web interface 340. As described herein, the web interface 340 may also order the messages for the member by constructing a user interface to display the messages in the order.

In this example embodiment, as a number of messages to be received by the member using the member client device 202 exceed a message frequency threshold value for the member, the message management system 150 may transmit a digest of messages instead of the messages as described herein.

Figure 4:
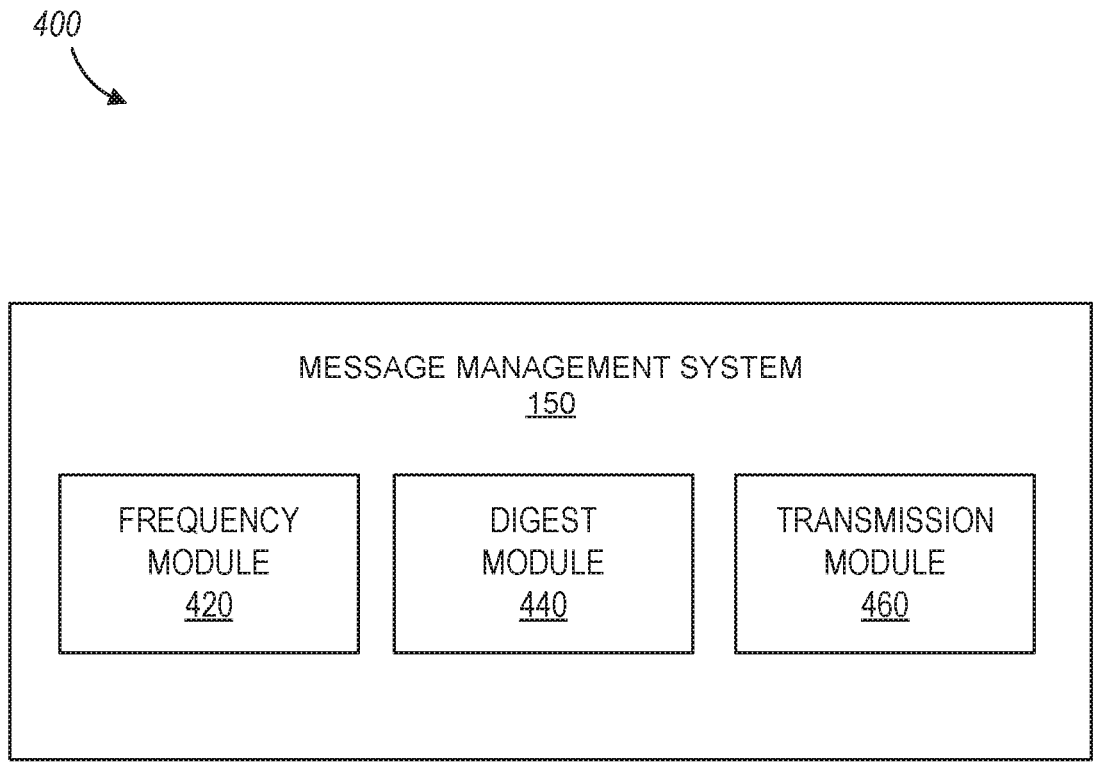
FIG. 4 is a block diagram illustrating a system for managing multiple messages, according to another example embodiment.

FIG. 4 is a block diagram illustrating a system 400 for managing multiple messages, according to another example embodiment. In one example embodiment, the system 400 is the message management system 150. In this example embodiment, the message management system 150 includes a frequency module 420, a digest module 440, and a transmission module 460.

In one example embodiment, the frequency module 420 is configured to determine a message transmission frequency threshold for a member of the online social networking service 100 using responses from the member.

In some examples, as a member receives messages from the online social networking service 100, the member responds positively to each of the messages. In one example, the member reads the message. In another example, the member clicks on the message. In another example, the member performs an action recommended by text in the message.

In other examples, the member receives messages from the online social networking service 100 and the member responds negatively to one or more of the messages. In one example, the member does not review the message. In another example, the member reports the message as spam. In another example, the member complains about the message. In another example, the member reports to the online social networking service 100 that the message is undesired.

As the member receives messages at a frequency that is below the members message transmission frequency threshold, the member responds positively to each of the messages. In another example, if too many messages are transmitted to the member, the member may begin responding negatively to the messages, as previously described. In this way, as the frequency module 420 monitors responses from a member, the frequency module 420 determines a message transmission frequency threshold for the member based, at least in part, on responses from the member.

In another example embodiment, the frequency module 420 determines a message transmission frequency threshold for a specific communication channel. In one example, the communication channel is email. In this example, the frequency module 420 determines the message transmission frequency based on emails transmitted to the member and the member's response to the emails. For example, as emails are transmitted to the member at a frequency that is less than the message transmission frequency threshold for the member, the member may respond positively. In another example, as emails are transmitted to the member at a frequency that is more than the message transmission frequency threshold for the member, the member may respond negatively.

In one example, the frequency module 420 calculates a current message transmission frequency by counting messages transmitted to the member over a recent period of time and dividing that number by the amount of time. In one example, a period of time is one day and the current message transmission frequency is determined by counting the number of messages transmitted to the member during that one day.

In one example embodiment, as the message management system 150 receives a message to be transmitted to the member, the frequency module 420 determines whether transmission of the message would cause the current message transmission frequency to exceed the member's message transmission frequency threshold. In response to the message causing the current message transmission frequency to exceed the message transmission frequency threshold for the member, the message management system 150 may store the message in a digest of messages for the member instead of transmitting the message to the member immediately. Further examples of storing the message in a digest are described in later paragraphs.

In another example embodiment, the communication channel is a text message. In this example, the frequency module 420 monitors text messages transmitted to the member and determines the message transmission frequency threshold for the member based on the member's responses to the text messages. By monitoring each different communication channel separately, the frequency module 420 may determine a message transmission frequency threshold for each of a wide range of available communication channels. For example, the frequency module 420 may determine different message transmission frequencies for a member for email, text messages, application messages, profile messages, or any other kind of message, as one skilled in the art may appreciate. In one specific example, the frequency module 420 determines that a member's message transmission frequency threshold is four messages a day, but of course this is not necessarily the case as the frequency module 420 may determine any number to be the message transmission threshold for a member communication channel.

In other embodiments, the frequency module 420 determines separate message transmission frequency thresholds for separate members of the online social networking service 100.

In one example embodiment, rather than allow all messages to be sent to the member prior to message transmission threshold being reached, the frequency module 420 may use a prediction function to score messages that are to be transmitted to the member. In one example, as messages are transmitted to the member at a frequency that is below the message transmission threshold for the member, the score for the prediction function will gradually decline. In one example, the prediction function subtracts a number of messages transmitted to the member over a recent period of time from the initial prediction score. If the result of the prediction function is above zero, then the frequency module 420 transmits the message to the member. If the result of the prediction function is below zero, then the frequency module 420 does not transmit the message to the member. Of course, other mathematical variations of a prediction function may be used, as one skilled in the art may appreciate, and this disclosure is not limited in this regard.

Similarly, as with the message transmission frequency threshold, the digest module, in one example embodiment, maintains a separate prediction function for each member of the online social networking service 100.

In another example embodiment, the frequency module 420 ignores a specific communication channel. In one example, the frequency module 420 does not monitor messages sent from a chat application.

In one example embodiment, frequency module 420 determines a message transmission frequency threshold for a specific message type. In certain examples, a message type is any one of the following: new member invites, new contacts, connection requests, news, alerts, weather, promotional messages, sales, service messages, or any other type of message. In this example embodiment, the frequency module 420 may determine a message transmission frequency threshold for any and/or each of the different message types.

In one example embodiment, the digest module 440 is configured to store a message to a digest of messages for the member in response to a current message transmission frequency exceeding the transmission frequency threshold for the member. As previously described, the message transmission frequency threshold for the member may or may not be based on a specific communication channel or a specific message type.

In one example embodiment, the digest module 440 determines when to send the digest of messages to the member. In one example, the digest module 440 stores the digest in the database 112.

In one example embodiment, the frequency module 420 immediately transmits a received message to the member in response to a priority of the message exceeding a send priority threshold value. In one example, the message management system 150 receives a send priority threshold value from an administrator of the system 150. In one example, the send priority threshold value is 100. In response to a message having a send priority threshold value of 100 or more, the frequency module 420 immediately sends the message to the member without storing the message in a digest module 440.

In certain examples, members of the online social networking service 100 that are famous or otherwise well-known may be assigned a higher priority value. In this example, in response to receiving a message from a famous person, the message may be immediately transmitted to the member (e.g., the message is not stored in a digest of messages, but is transmitted to the member without intentional delay). In one example embodiment, the president of the United States receives a high priority value. In one example, the high priority value is 1000 or more. In this way, although a member may have received messages that exceed the member's message transmission frequency threshold, in response to receiving a message from the president of the United States, the message will be transmitted to the member without delay while other messages from members with lower priority values may be stored in the digest. This may be the case because the priority value assigned to the sender of the message exceeds the send priority threshold value. The message management system 150 may receive a list of members of the online social networking service and their respective priority values.

In another example embodiment, the digest module 440 stores messages for a member of the online social networking service 100 for a specific period of time. In one example, the period of time is 2 days. In response to receiving messages that would cause a current message transmission frequency to exceed the message transmission frequency threshold for a member and storing the message in a digest of messages, the digest module 440 may maintain the digest for two days before considering whether to transmit the digest to the member. After the period of time expires, the transmission module 460 transmits the digest of messages to the member.

In one example embodiment, the digest module 440 removes messages from the digest in response to the member viewing the message using another communication channel. In one example, the messages in the digest are emails and in response to the member retrieving one or more of the emails in the digest using the web interface 340, the digest module 440 removes the viewed emails from the digest of emails. In this example, when the digest is transmitted to the member, it includes only messages that the member has not yet viewed.

In another example embodiment, the transmission module 460 is configured to transmit the digest of messages to the member in response to a send score for the digest exceeding a send score threshold. In one example embodiment, the send score is calculated using the number of messages in the digest.

In one example embodiment, the send score is the count of messages in the digest. In another example embodiment, the transmission module 460 determines the send score by counting a point for each message in the digest for each hour the message is in the digest. In one example, the send score is 100 and the transmission module 460 transmits the digest of messages to the member in any of the following condition:

1) 100 messages stored in the digest for one hour each.
    2) 50 messages stored in the digest for two hours each.
    3) 25 messages stored in the digest for four hours each.
    4) 50 messages stored in the digest for one hour each and 10 messages stored in the digest for five hours each.

In another example embodiment, the send score is calculated using one or more equations. Of course, the send score for the digest may be calculated using any other mathematical variations and this disclosure is not limited in this regard. In another example embodiment, the send score is further calculated using the priority value for each message in the digest.

In one example embodiment, the send score for the digest of messages is calculated at regular time intervals. In one example, the regular time interval is two hours. In another example, the time interval is daily. Of course, other time intervals may be used and this disclosure is not limited in this regard. In one example, the transmission module 460 adds the send score threshold to the send score to cause the send score to exceed the send score threshold. In this way, the transmission module 460 causes transmission of the digest. In one example, the transmission module 460 adds the send score threshold at 8 am causing transmission of the digest each day at 8 am. Of course, other times may be used and this disclosure is not limited in this regard.

In another example, the transmission module 460 transmits the digest of messages daily. In one example, the send score is 10 and the send score is determined by adding 10 to the send score daily. In this way, the transmission module 460 transmits the digest daily. Of course, other time periods or send score equations may be used and this disclosure is not limited in this regard.

In another example embodiment, in response to receiving a message that exceeds a send priority threshold, the digest module 440 adds the message to the digest and transmits the digest to the member.

In one example embodiment, the transmission module 460 determines the send score in response to receiving a new message for the member. In this way, the new message is a trigger for calculating the send score and transmitting the digest to the member in response to the send score for the digest exceeding the send score threshold value.

Figure 5:
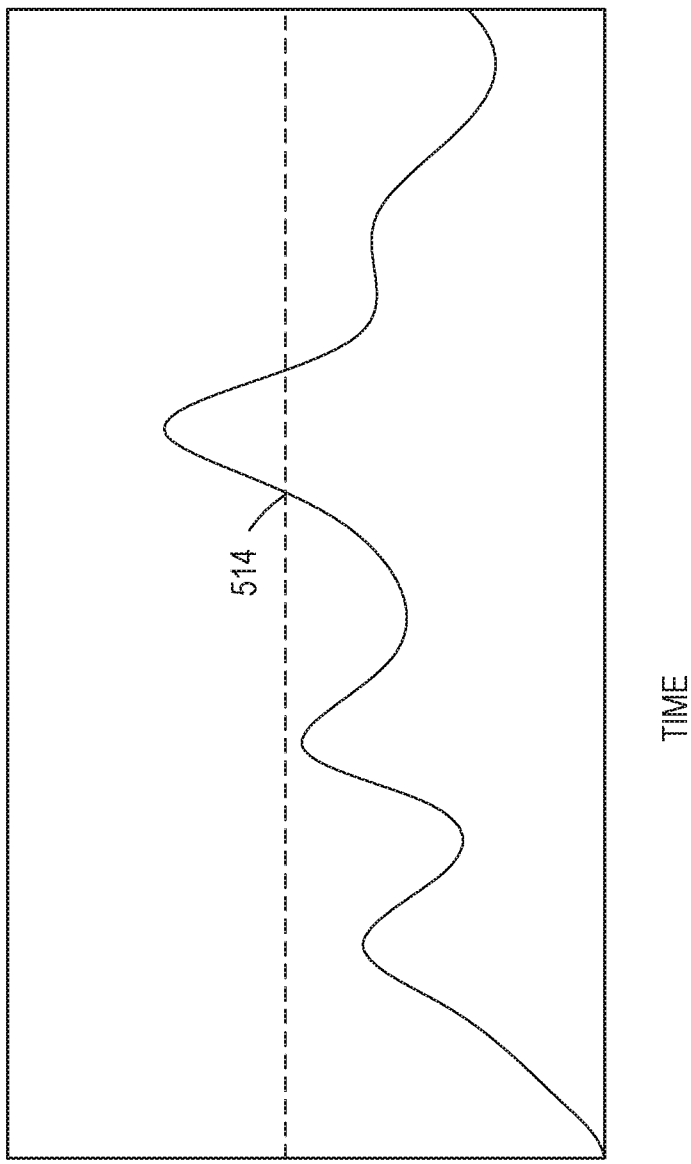
FIG. 5 is a plot illustrating a member's response to multiple messages, according to an example embodiment.

FIG. 5 is a plot 500 illustrating a member's response to multiple messages, according to an example embodiment. In this example embodiment, the number of messages transmitted to a member of the online social networking service is plotted as a function of time.

In one example embodiment, the frequency module 420 monitors responses from the member to the messages. In this example embodiment, before a time point 514, the member has responded positively to the messages. However, after point 514, as indicated in the plot, the member begins to respond negatively. The frequency module 420 determines that the member's message frequency transmission threshold is the transmission frequency at the point 514 when the member began responding negatively.

Figure 6:
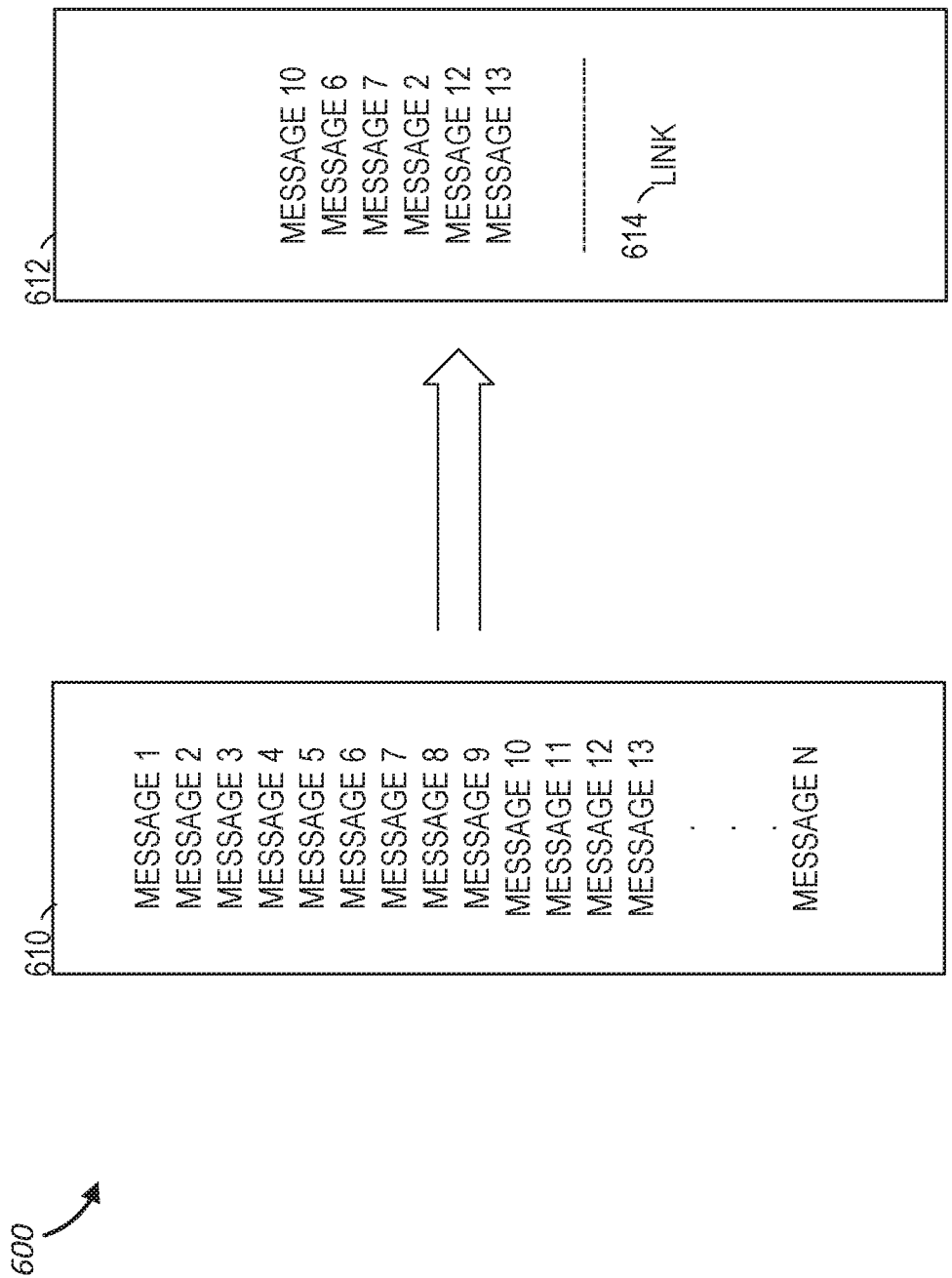
FIG. 6 is an illustration depicting a message digest, according to one example embodiment.

FIG. 6 is an illustration depicting a message digest 600, according to one example embodiment. In this example embodiment, a digest 610 includes many messages. In one example, the digest 610 includes N number of messages. Of course, the letter 'N' may represent any number of messages and this disclosure is not limited in this regard.

In one example embodiment, in response to the send score for the digest exceeding the send score threshold, the transmission module 460 transmits the digest to the member. However, in one example embodiment, the digest module 440 ranks the messages in the digest 610 according to a priority of the message. As previously described, the priority of the message may be based on common attributes between the sender of the message and the member to receive the message.

In one example embodiment, the priority score increases as more attributes are common between the sender and the member. In certain examples, common attributes include common workplaces, common fields of study, common experience levels, common job positions, common connections, common attendance at an academic institution, previous connections, common location, common country, common city, common language, common gender, common cultural attributes, common religious persuasion, being members of a common group, or any other attribute that may be common between the sender and the member. In one example, the priority score is a simple count of common attributes. In another example, the priority score is calculated using an equation. Of course, one skilled in the art may recognize other ways in which a priority score may be determined and this disclosure is not limited in this regard.

In another example embodiment, the digest module 440 removes messages from the digest that do not meet or exceed a threshold priority value. In the example depicted in FIG. 6, the digest module 612 includes messages 10, 6, 7, 2, 12, and 13 because those messages have a priority value that is above a priority value threshold.

In one example embodiment, the digest module 612 includes a link 614 in the digest to the messages that did not meet the priority value threshold. In this way, the member may still access those messages although they did not meet the priority value threshold. Furthermore, in an example where the member is overwhelmed with messages, the member is shown only the messages with the highest priority.

In another example embodiment, the digest module 440 includes the top 10 messages with the highest priority values and provides a link to the remaining messages. In another example embodiment, the digest module 440 learns which messages have a highest priority according to a machine learned algorithm, as one skilled in the art may appreciate.

Figure 7:
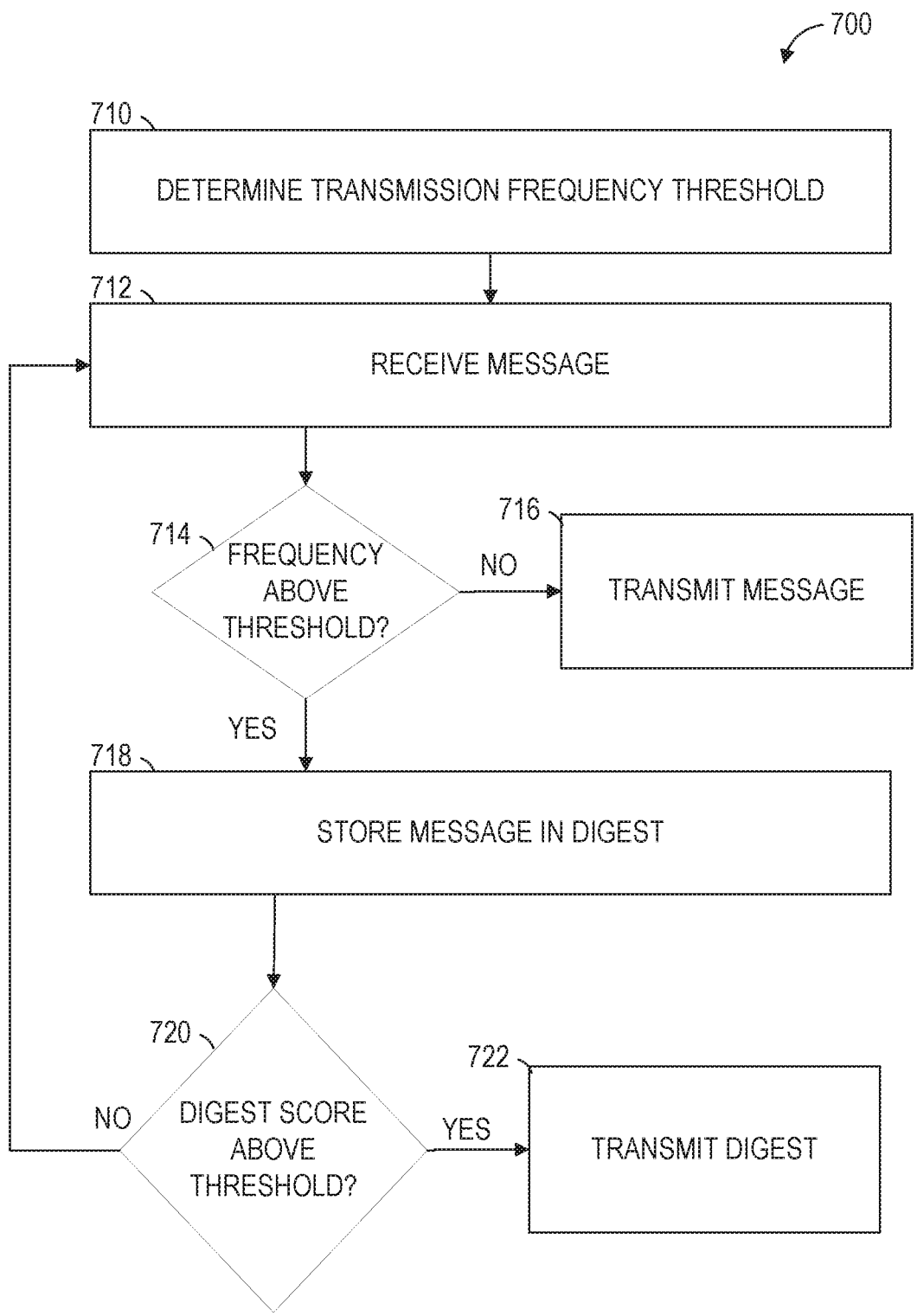
FIG. 7 is a flow chart diagram illustrating a method of managing multiple messages, according to one example embodiment.

FIG. 7 is a flow chart diagram illustrating a method 700 of managing multiple messages, according to one example embodiment. According to one example embodiment, the method 700 is performed by one or more modules of the message management system 150 and is described by a way of reference thereto.

In one example embodiment, the method 700 begins at operation 710, when the frequency module 420 determines a message transmission frequency threshold for a member of an online social networking service using responses form the member. In one example, the message management system 150 transmits 5 or less messages in a day and the member responds positively to the messages; however, in response to the message management system 150 transmitting 7 or more messages in a day and the member responding negatively, the frequency module 420 determines that the message transmission frequency threshold for the member is 6 messages in a day.

The method 700 continues at operation 712 and the frequency module 420 receives a message to be transmitted to the member. The method 700 continues at operation 714 and the frequency module 420 determines whether transmission of the message would cause a current message transmission frequency to exceed the member's message transmission frequency threshold.

In response to the current message transmission frequency being below a message transmission frequency threshold for the member, the method 700 continues at operation 716 and the frequency module 420 transmits the received message to the member.

In response to the current message transmission frequency being at or above the message transmission frequency threshold for the member, the method 700 continues at operation 718 and the digest module 440 stores the message in a digest of messages.

The method 700 continues at operation 720 and the transmission module 460 determines whether the send score of the digest of messages is the above send score threshold. In response to the send score for the digest of messages not being above the send score threshold, the method 700 continues at operation 712. In response to the send score for the digest of messages exceeding the send score threshold, the method 700 continues at operation 722 and the transmission module 460 transmits the digest of messages the member.

Figure 8:
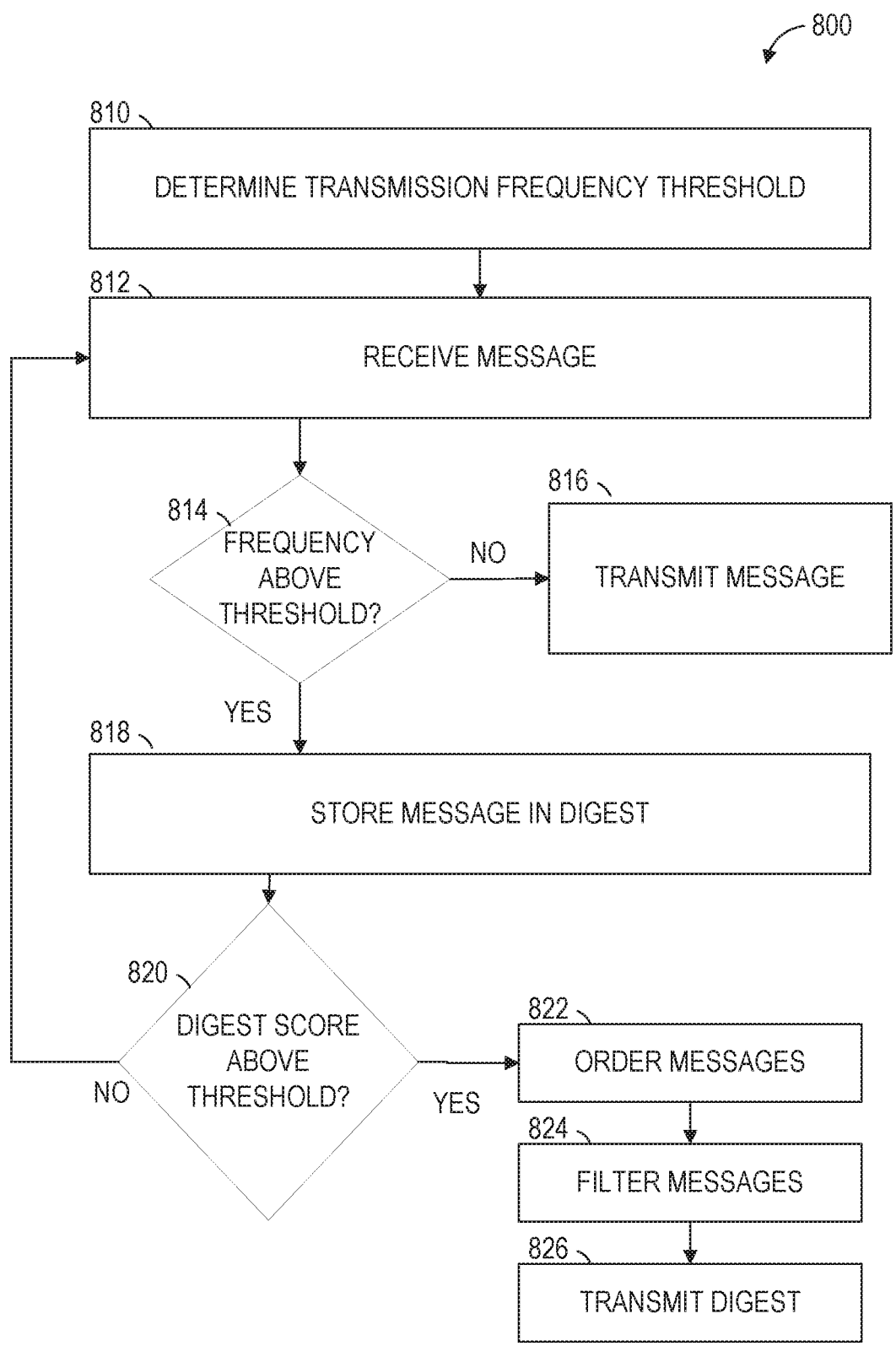
FIG. 8 is a flow chart diagram illustrating another method of managing multiple messages, according to one example embodiment.

FIG. 8 is a flow chart diagram illustrating another method of managing multiple messages, according to one example embodiment. According to one example embodiment, the method 800 is performed by one or more modules of the message management 120 system 150 and is described by a way of reference thereto.

In one example embodiment, the method 800 begins at operation 810, when the frequency module 420 determines the message transmission frequency threshold for a member as previously described. The method 800 continues at operation 812 and the frequency module 420 receives a message to be transmitted to the member.

The method 800 continues at operation 814 and the frequency module 420 determines whether transmission of the message would cause a current message transmission frequency to exceed the member's message transmission frequency threshold.

In response to the current message transmission frequency being below a message transmission frequency threshold for the member, the method 800 continues at operation 816 and the frequency module 420 transmits the received message to the member.

In response to the current message transmission frequency being at or above the message transmission frequency threshold for the member, the method 800 continues at operation 818 and the digest module 440 stores the message in a digest of messages.

The method 800 continues at operation 820 and the transmission module 460 determines whether the send score of the digest of messages is the above the send score threshold. In response to the send score for the digest of messages not being above send score threshold, the method 800 continues at operation 812.

In response to the send score for the digest of messages being equal to or above the send score threshold, the method 800 continues at operation 822 where the digest module 440 ranks the messages in the digest according to a priority value. The method 800 continues at operation 824 and the digest module 440 filters the messages in the digest by removing messages that do not exceed a certain priority value. In one example, the priority value is received from an administrator of the online social networking service 100. In another example the priority value is set according to the priority value of a message at a specific index. For example where the top 10 messages are to be included in the digest of messages that will be sent to the member, the priority value may be set to the priority value of the $11^{th}$ message in the digest. In this way, the digest module 440 filters the messages in the digest, thereby resulting in a set of messages that have the highest priority value as previously described.

The method 800 continues at operation 826 and the transmission module 460 transmits the filtered digest of messages to the member. In one example, the transmission module 460 constructs an email message that includes the messages in the filtered digest of messages.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 9:
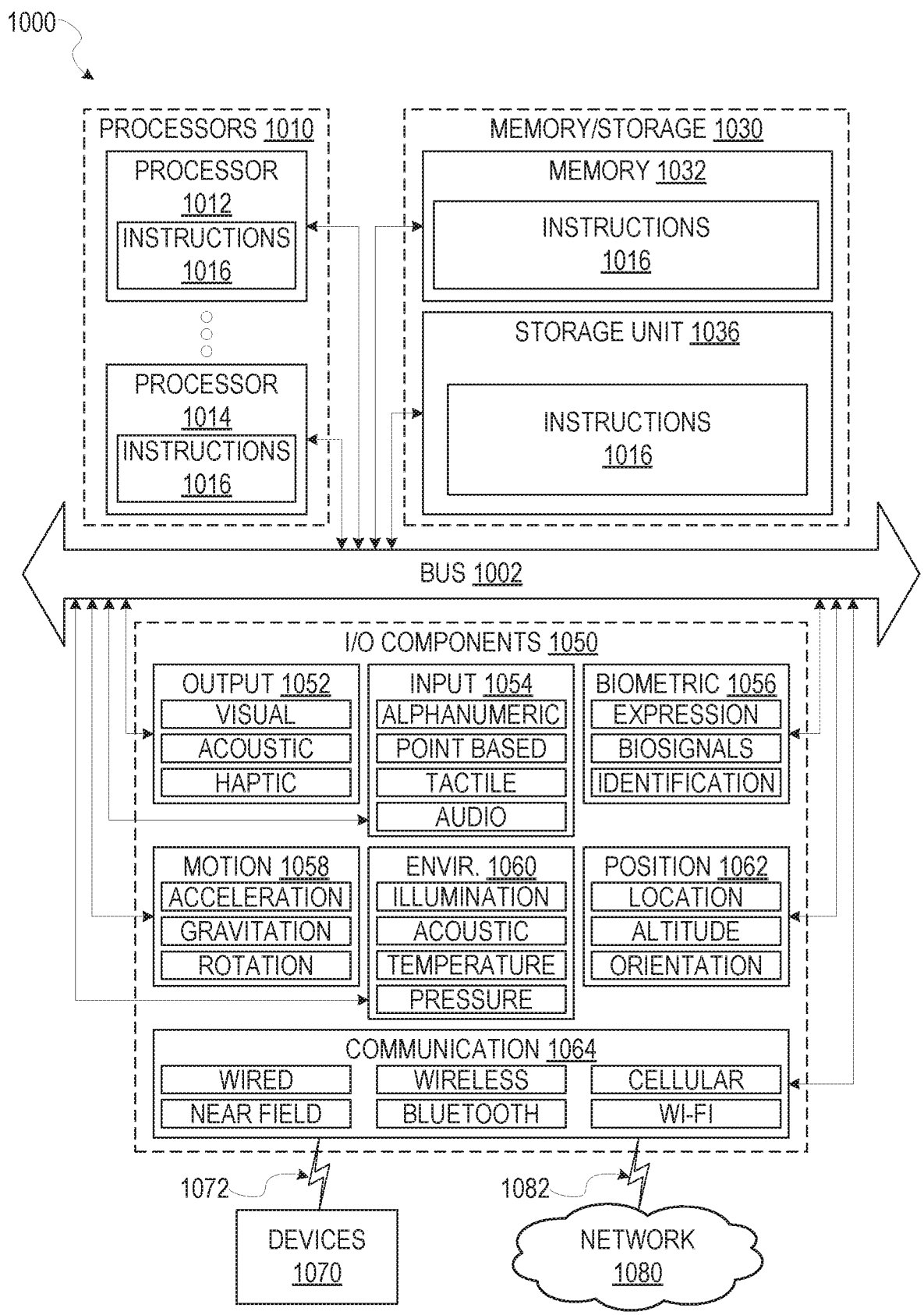
FIG. 9 is a block diagram illustrating components of a machine, according to some example embodiments, able to read instructions from a machine-readable medium (e.g., a machine-readable storage medium) and perform any one or more of the methodologies discussed herein

FIG. 9 is a block diagram illustrating components of a machine, according to some example embodiments, able to read instructions from a machine-readable medium (e.g., a machine-readable storage medium) and perform any one or more of the methodologies discussed herein Specifically, FIG. 9 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 7-8. Additionally, or alternatively, the instructions may implement one or more of the components of FIG. 4. The instructions transform the general, non-programmed machine into a particular machine programmed to carry out the described and illustrated functions in the manner described. In alternative embodiments, the machine 1000 operates as a stand-alone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a personal digital assistant (PDA), or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 9 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 9. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the UO components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    at least one hardware processor;
    a machine-readable medium having instructions stored thereon, which, when executed by the at least one hardware processor, cause the at least one hardware processor to perform operations comprising:
        determining a message transmission frequency threshold for a user of an online service based on positive responses of the user to a first plurality of messages received at a first message transmission frequency that is below the message transmission frequency threshold and on negative responses of the user to a second plurality of messages received at a second message transmission frequency that is at or above the message transmission frequency threshold;
        receiving a message that is to be transmitted to the user, the message being received at a time subsequent to the first plurality of messages being received and the second plurality of messages being received;
        storing the message in a digest of messages for the user in response to a current message transmission frequency exceeding the transmission frequency threshold, the current message transmission frequency corresponding to the time at which the message is received;
        removing messages in the digest in response to the user viewing data in the respective messages using another communication channel; and
        transmitting the digest to the user in response to a send score for the digest exceeding a send score threshold, the send score calculated using a number of messages in the digest.

2. The system of claim 1, wherein the message transmission frequency threshold is specific to a channel, the message is to be transmitted to the user using the channel, and the digest is transmitted to the user using the channel.

3. The system of claim 1, wherein the messages in the digest are ordered according to a priority value, the digest is limited to messages that exceed a threshold priority value, the digest further including a link to messages that do not exceed the threshold priority value.

4. The system of claim 3, wherein the priority values for the messages are calculated using values in a profile for the user that are consistent with values in a profile for the respective senders of the messages.

5. The system of claim 1, wherein the operations further comprise removing messages in the digest in response to the user viewing data in the respective messages using another communication channel.

6. The system of claim 1, wherein the message transmission frequency threshold is determined using a multi-objective optimization problem, the multi-objective optimization problem using an estimated number of positive responses and an estimated number of negative responses.

7. The system of claim 1, wherein the positive responses comprise at least one of the user reading a message, the user clicking on the message, and the user performing an action recommended by text in the message.

8. The system of claim 1, wherein the negative responses comprise at least one of the user not reviewing a message, the user reporting the message as spam, the user submitting a complaint about the message, and the user reporting that the message is undesired.

9. A computer-implemented method comprising:
determining, by at least one hardware processor, a message transmission frequency threshold for a user of an online service based on positive responses of the user to a first plurality of messages received at a first message transmission frequency that is below the message transmission frequency threshold and on negative responses of the user to a second plurality of messages received at a second message transmission frequency that is at or above the message transmission frequency threshold;
receiving, by the at least one hardware processor, a message that is to be transmitted to the user, the message being received at a time subsequent to the first plurality of messages being received and the second plurality of messages being received;
storing, by the at least one hardware processor, the message in a digest of messages for the user in response to a current message transmission frequency exceeding the transmission frequency threshold, the current message transmission frequency corresponding to the time at which the message is received;
removing, by the at least one hardware processor, messages in the digest in response to the user viewing data in the respective messages using another communication channel; and
transmitting, by the at least one hardware processor, the digest to the user in response to a send score for the digest exceeding a send score threshold, the send score calculated using a number of messages in the digest.

10. The computer-implemented method of claim 9, wherein the message transmission frequency threshold is specific to a channel, the message is to be transmitted to the user using the channel, and the digest is transmitted to the user using the channel.

11. The computer-implemented method of claim 9, wherein the messages in the digest are ordered according to a priority value, the digest is limited to messages that exceed a threshold priority value, the digest further including a link to messages that do not exceed the threshold priority value.

12. The computer-implemented method of claim 11, wherein the priority values for the messages are calculated using values in a profile for the user that are consistent with values in a profile for the respective senders of the messages.

13. The computer-implemented method of claim 9, wherein the operations further comprise removing messages in the digest in response to the user viewing data in the respective messages using another communication channel.

14. The computer-implemented method of claim 9, wherein the message transmission frequency threshold is determined using a multi-objective optimization problem, the multi-objective optimization problem using an estimated number of positive responses and an estimated number of negative responses.

15. The computer-implemented method of claim 9, wherein the positive responses comprise at least one of the user reading a message, the user clicking on the message, and the user performing an action recommended by text in the message.

16. The computer-implemented method of claim 9, wherein the negative responses comprise at least one of the user not reviewing a message, the user reporting the message as spam, the user submitting a complaint about the message, and the user reporting that the message is undesired.

17. A non-transitory machine-readable medium having instructions stored thereon, which, when executed by at least one hardware processor, cause the at least one hardware processor to perform operations comprising:
determining a message transmission frequency threshold for a user of an online service based on positive responses of the user to a first plurality of messages received at a first message transmission frequency that is below the message transmission frequency threshold and on negative responses of the user to a second plurality of messages received at a second message transmission frequency that is at or above the message transmission frequency threshold;
receiving a message that is to be transmitted to the user, the message being received at a time subsequent to the first plurality of messages being received and the second plurality of messages being received;
storing the message in a digest of messages for the user in response to a current message transmission frequency exceeding the transmission frequency threshold, the current message transmission frequency corresponding to the time at which the message is received;
removing messages in the digest in response to the user viewing data in the respective messages using another communication channel; and
transmitting the digest to the user in response to a send score for the digest exceeding a send score threshold, the send score calculated using a number of messages in the digest.

18. The non-transitory machine-readable medium of claim 17, wherein the message transmission frequency threshold is specific to a channel, the message is to be transmitted to the user using the channel, and the digest is transmitted to the user using the channel.

19. The non-transitory machine-readable medium of claim 17, wherein the messages in the digest are ordered according to a priority value, the digest is limited to messages that exceed a threshold priority value, the digest further including a link to messages that do not exceed the threshold priority value.

20. The non-transitory machine-readable medium of claim 19, wherein the priority values for the messages are calculated using values in a profile for the user that are consistent with values in a profile for the respective senders of the messages.

* * * * *